Jan. 27, 1931.  I. HECHENBLEIKNER  1,790,503
PROCESS FOR MANUFACTURE OF AMMONIUM PHOSPHATE
Filed July 1, 1927
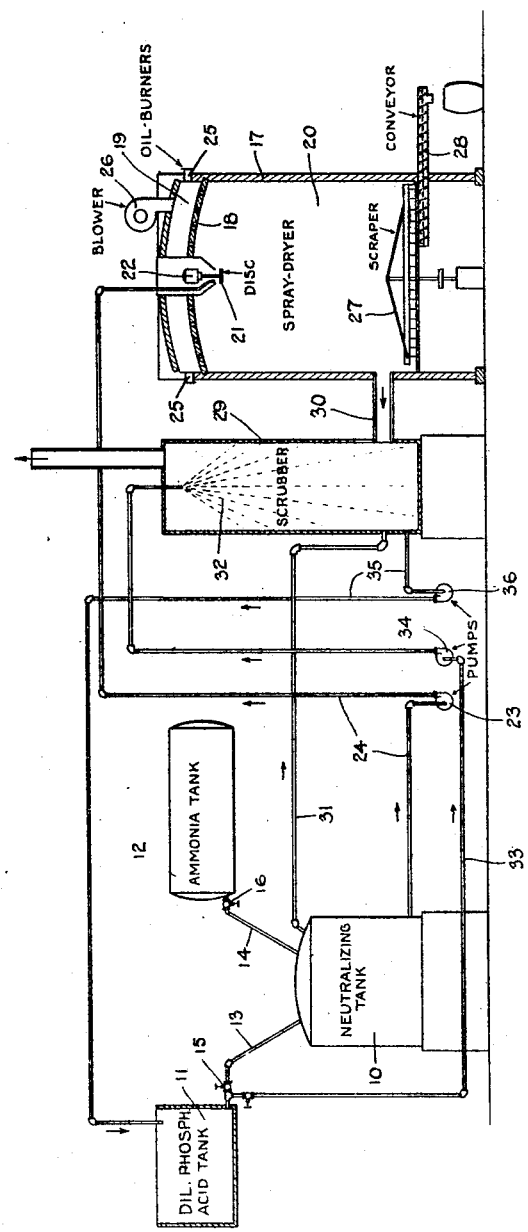
INVENTOR
I. Hechenbleikner
BY
ATTORNEYS Patented Jan. 27, 1931

1,790,503

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

PROCESS FOR MANUFACTURE OF AMMONIUM PHOSPHATE

Application filed July 1, 1927. Serial No. 202,823.

This invention relates to the manufacture of ammonium salts, and more particularly to a process for manufacturing ammonium phosphate.

In the manufacture of ammonium phosphate from ammonia and phosphoric acid, a number of difficulties are encountered, having their origin in the ease or readiness with which the ammonia phosphates decompose during the evaporation and drying process. In order to reduce this objectionable decomposition to a minimum, the phosphoric acid used in the process is, according to prior practice, concentrated before the same is mixed with the ammonia or the phosphoric acid is saturated with the ammonia reagent. Although with this prior practice only a small amount of water is required to be removed from the product in the evaporation or drying step of the process, a large loss nevertheless takes place in the drying process which renders such prior practice objectionable.

The principal object of my present invention centers about the provision of a process for manufacturing ammonium phosphate in which the difficulties and objections inherent in and encountered in the practice of such prior methods are effectively obviated or reduced to a minimum. I have discovered that the ammonia phosphates can be produced without any material decomposition taking place by reacting ammonia with phosphoric acid producing a solution of ammonia phosphate, and by then evaporating the ammonia phosphate solution in an atomizing or spray drying machine where the evaporation takes place practically instantly so that a dry powder is obtained before any decomposition to speak of has had time to take place. The prime desideratum of my present invention, therefore, is directed to the provision of this process and the process steps utilized therein.

In the preferred practice of the process the ammonia phosphate solution is first obtained in a neutral state by the reacting of ammonia with weak or dilute phosphoric acid and the neutral solution is then evaporated in an atomizing or spray drying machine where drying or evaporation is carried on by hot gases produced in any known manner. Also, in practising the process in the preferred manner, the gases liberated in the spray drying machine and in the neutralizing step of the process are scrubbed by means of dilute phosphoric acid, the products of the scrubbing step being used for the neutralizing step of the process. When the manufacturing process is carried out in this preferred manner, not only is the ammonium phosphate produced without material decomposition taking place, but the process is characterized by high heat efficiency, a simplicity of operation and adaptability to the use of simple apparatus capable of being operated at a low cost of installation and upkeep.

To the accomplishment of the foregoing and such other objects as will hereinafter appear, my invention consists in the process, the steps thereof and their relation one to the other as hereinafter more particularly described and sought to be defined in the claims, reference being had to the accompanying drawing which shows the preferred embodiment of my invention, and in which The figure is a diagrammatic layout of a simple plant showing the practice of the method of my invention.

In the first step of the process the ammonia is reacted with the phosphoric acid to produce a solution of ammonium phosphate, and in the preferred practice of this step of the process the ammonia is neutralized with a weak or dilute phosphoric acid to produce a neutral solution of ammonium phosphate. This step may be carried out by the provision of a neutralizing tank 10 which is charged with a dilute or weak phosphoric acid coming from a tank 11 and with ammonia coming from a tank 12, the said tanks 11 and 12 communicating with the neutralizing tank 10 by means of the ducts or pipes 13 and 14 respectively, the flow or feed from the tanks 11 and 12 being controlled by suitable valves 15 and 16 provided in said ducts or pipes 13 and 14. This step of the process is employed with the usual ammonium phosphates of commerce which are mono and di-ammonium phosphates. Mono-ammonium phosphate is the most stable compound, di-ammonium phosphate being less stable. Tri-ammonium phosphate is decomposed at ordinary temperatures and therefore by ammonium phosphate referred to herein I mean the mono and di-ammonium phosphates; and the neutralization step therefore is carried out to neutralize the mono-ammonium and the di-ammonium phosphates.

The neutral ammonia phosphate solution obtained in this step of the process is then evaporated or dried in a spray dryer of suitable design, as for example, a Krause dryer, similar to those used for drying of milk, where evaporation is carried on by hot gases produced in any known manner. Preferably I employ for this purpose an atomizing or spray drying machine generally designated as 17 having a construction more particularly described and claimed in my copending application to Combined spray dryer and burner, Serial No. 192,463, filed May 18, 1927. This spray drying machine comprises an enclosure subdivided by an orificed partition 18 into a combustion chamber 19 and a drying chamber 20, said spray drying machine being provided with a centrifugal spraying device 21 operated at high speed by a motor 22. The spraying device 21 embodies preferably a disc construction such as is set forth in my copending application to Atomizing apparatus, Serial No. 192,464, filed May 18, 1927.

The neutral solution obtained from the neutralizing tank 10 is fed by means of a pump 23 through the feed line 24 and into the disc or other spraying device 21 where the neutral solution is sprayed out in a very thin film which is subjected to hot gases coming through the orificed partition 18 and from the combustion chamber 19, said gases being preferably produced by means of oil burners 25, 25. A blower 26 is associated with the spray drying apparatus 17 and serves to supply the necessary amount of air which enters the combustion chamber 19, the said blower being also utilized in association with the oil burners 25, 25, all as more particularly described in my aforesaid application, Serial No. 192,463. The hot air or gas used for this evaporating step can be supplied at any suitable temperature, for instance, as high as 400° to 600° C. without causing any damage to the material, and the evaporation takes place practically instantly so that a dry powder is obtained before any decomposition to speak of can take place. The powdered ammonia phosphate thus obtained is removed from the spray dryer 17 by means of a rotary scraper 27 which feeds the material to a screw conveyor 28.

In the practice of this spray drying step, not only is the disadvantage of decomposition encountered in prior processes eliminated or reduced to a minimum, but the heat efficiency of the process is obtained as high as can be obtained by any single effect vacuum evaporator. Further advantages of the process reside in the simplicity of the apparatus used for the process and the ease with which the evaporation or drying and conditioning of the material are carried out all in one step, saving labor, installation and upkeep costs.

Although in the practice of the foregoing steps decomposition of the ammonium phosphates is reduced to a minimum, such decomposition is impossible to avoid completely, especially when di-ammonium phosphate is produced which is easily decomposed. Decomposition of such phosphates and the liberation of ammonia gases take place both in the neutralizing tank 10 and in the spray dryer 17.

For reclaiming any of the gases liberated in the spray drying machine 17 as well as in the neutralizing tank 10, I prefer to provide a scrubbing system comprising a packed tower or a spray over which the dilute phosphoric acid to be used in the neutralizing step is sprayed. This scrubbing system is shown in the drawings in the form of a spray tower 29 communicating by means of the passage 30 with the drying chamber 20 and also communicating by means of the piping 31 with the neutralizing tank 10. The off gases liberated in the drying chamber 20 and neutralizing tank 10 flow through the communicating passage and piping into the scrubbing tower 29 in the direction indicated by the arrows in the drawing; and through this scrubbing tower is sprayed, as indicated at 32, the dilute phosphoric acid which is fed from the tank 11 through the communicating piping 33, the said acid being forced to the top of the tower by means of a pump 34. The products of this scrubbing tower are returned to the acid tank 11 by means of the ducts or piping 35 which communicatingly interconnect the bottom of the scrubbing tower 29 with the top of the phosphate acid tank 11, a pump 36 being provided in these communicating lines. By this means and method any ammonia that may occur from a heat decomposition will be recovered in the scrubbing tower and reused in the process, the said scrubbing tower also serving to preheat the solution for the process.

The method of practising the process and operating the apparatus therefor and the many advantages thereof will, in the main, be fully apparent from the above detailed description thereof. It will be further apparent that while I have described the process and the plant layout therefor specifically, showing the practice of the steps in the preferred manner, I may make many changes and modifications, both in the structure and in the steps of the process, and while I have shown the process as applied to the making of phosphate of ammonia, the same may be employed for the manufacture of other ammonia salts, all without departing from the spirit of the invention, defined in the following claims.

I claim:

1. The process of manufacturing an ammonia salt which consists in reacting ammonia with phosphoric acid producing a solution of the ammonia salt, in evaporating the solution in an atomizing machine or spray dryer producing the ammonia salt in powdered form, and in scrubbing the gases liberated in said spray dryer with a part of said acid.

2. The process of manufacturing ammonia phosphate which consists in reacting ammonia with dilute phosphoric acid producing a neutral solution of ammonia phosphate, in evaporating the neutral solution in an atomizing machine or spray dryer producing a powdered ammonia phosphate, and in scrubbing the gases liberated in said spray dryer with dilute phosphoric acid.

3. The process of manufacturing an ammonia salt which consists in reacting ammonia with phosphoric acid in a tank producing a solution of the ammonia salt, in feeding the said solution from said tank into a spray drying machine, in evaporating said solution in said spray drying machine producing the ammonia salt in powdered form, in conducting the gases liberated in said spray drying machine through a scrubbing system through which an acid is fed, and in utilizing the product of said scrubbing system in the first reacting step of the process.

4. The process of manufacturing ammonia phosphate which consists in reacting ammonia with dilute phosphoric acid in a tank producing a neutral solution of ammonia phosphate, in feeding the said neutral solution from said tank into a spray drying machine, in evaporating said neutral solution in said spray drying machine producing a powdered ammonia phosphate, in conducting the gases liberated in said spray drying machine through a scrubbing system through which dilute phosphoric acid is fed, and in utilizing the product of said scrubbing system in the neutralizing step of the process.

5. The process of manufacturing ammonia phosphate which consists in reacting ammonia with phosphoric acid in a tank producing a solution of ammonia phosphate, in feeding the said solution from said tank into a spray drying machine, in evaporating said solution in said spray drying machine producing a powdered ammonia phosphate, in conducting the gases liberated in said tank and spray drying machine through a scrubbing system through which phosphoric acid is fed, and in utilizing the product of said scrubbing system in the reacting step of the process.

6. The process of manufacturing ammonia phosphate which consists in reacting ammonia with dilute phosphoric acid in a tank producing a neutral solution of ammonia phosphate, in feeding the said neutral solution from said tank into a spray drying machine, in evaporating said neutral solution in said spray drying machine producing a powdered ammonia phosphate, in conducting the gases liberated in said spray drying machine and neutralizing tank through a scrubbing system through which dilute phosphoric acid is fed, and in utilizing the product of said scrubbing system in the neutralizing step of the process.

Signed at Charlotte, in the county of Mecklenburg and State of North Carolina, this 24 day of June A. D. 1927.

INGENUIN HECHENBLEIKNER.